Figure 1:
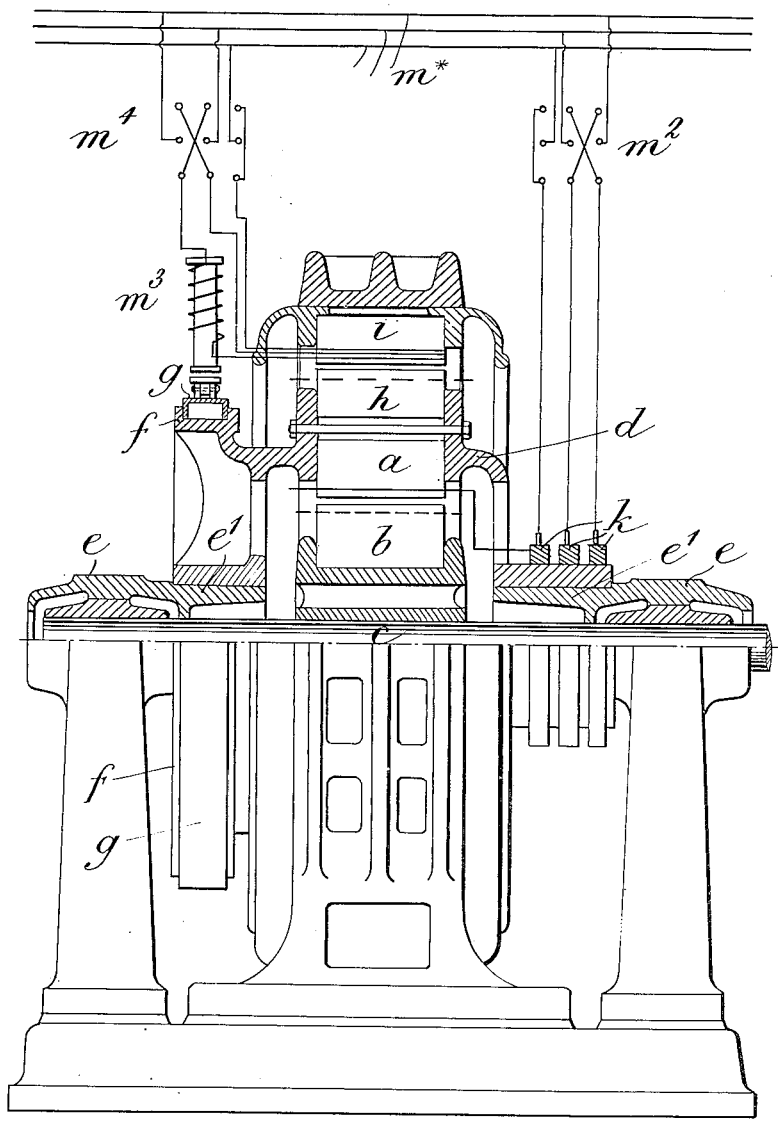

H. A. MAVOR.
MULTIPHASE ELECTRIC INDUCTION MOTOR.
APPLICATION FILED APR. 17, 1908.

912,144.

Patented Feb. 9, 1909.
5 SHEETS—SHEET 1.

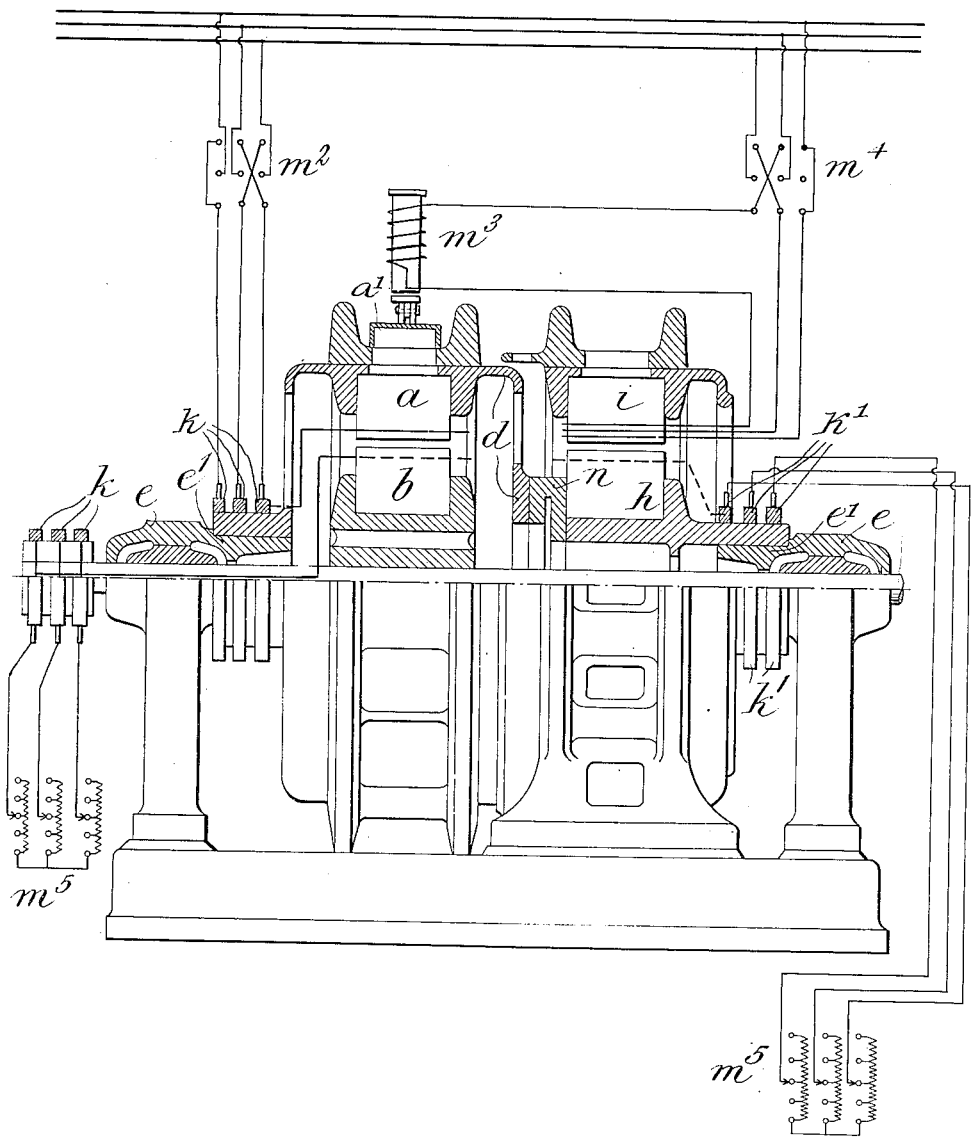

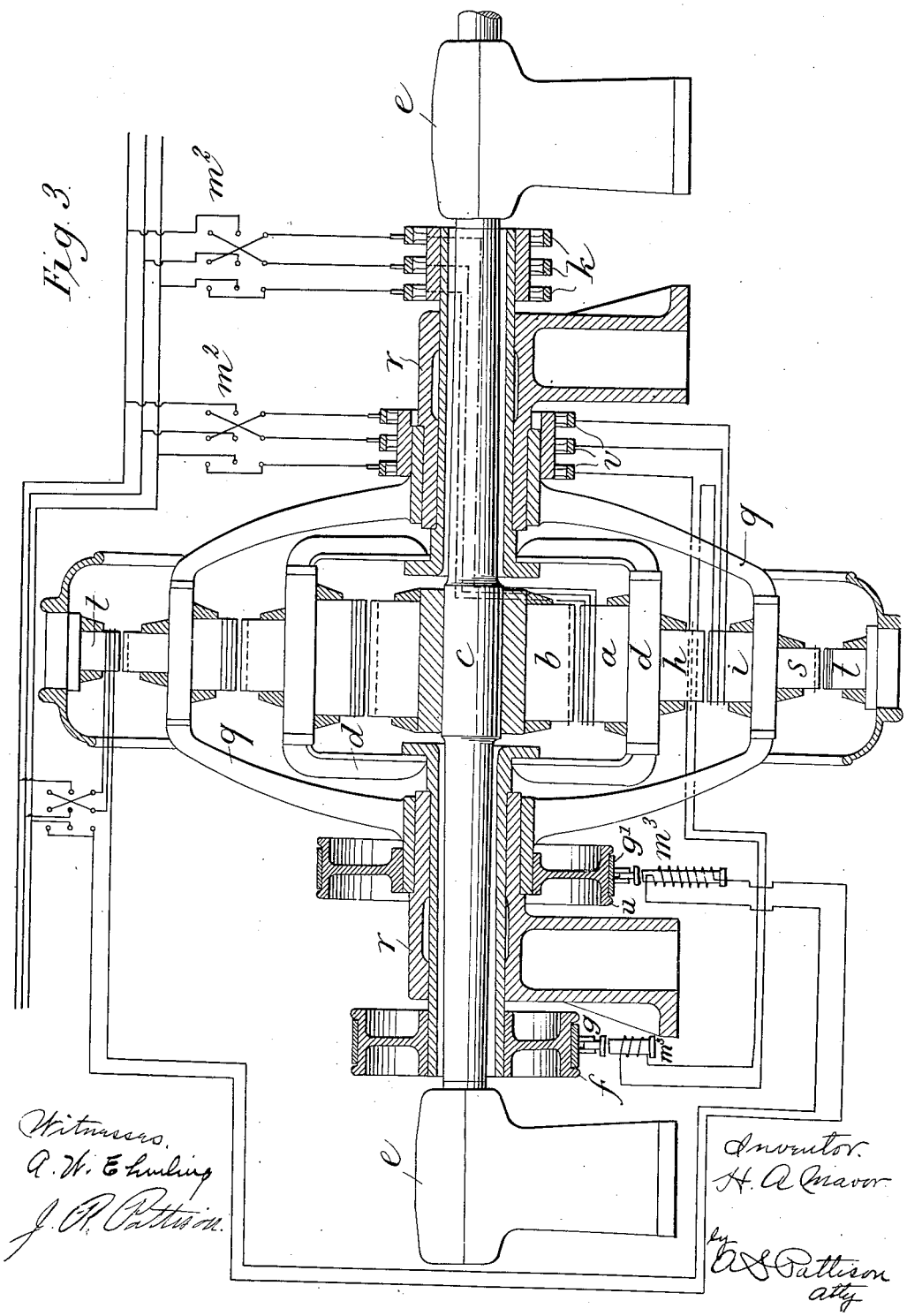

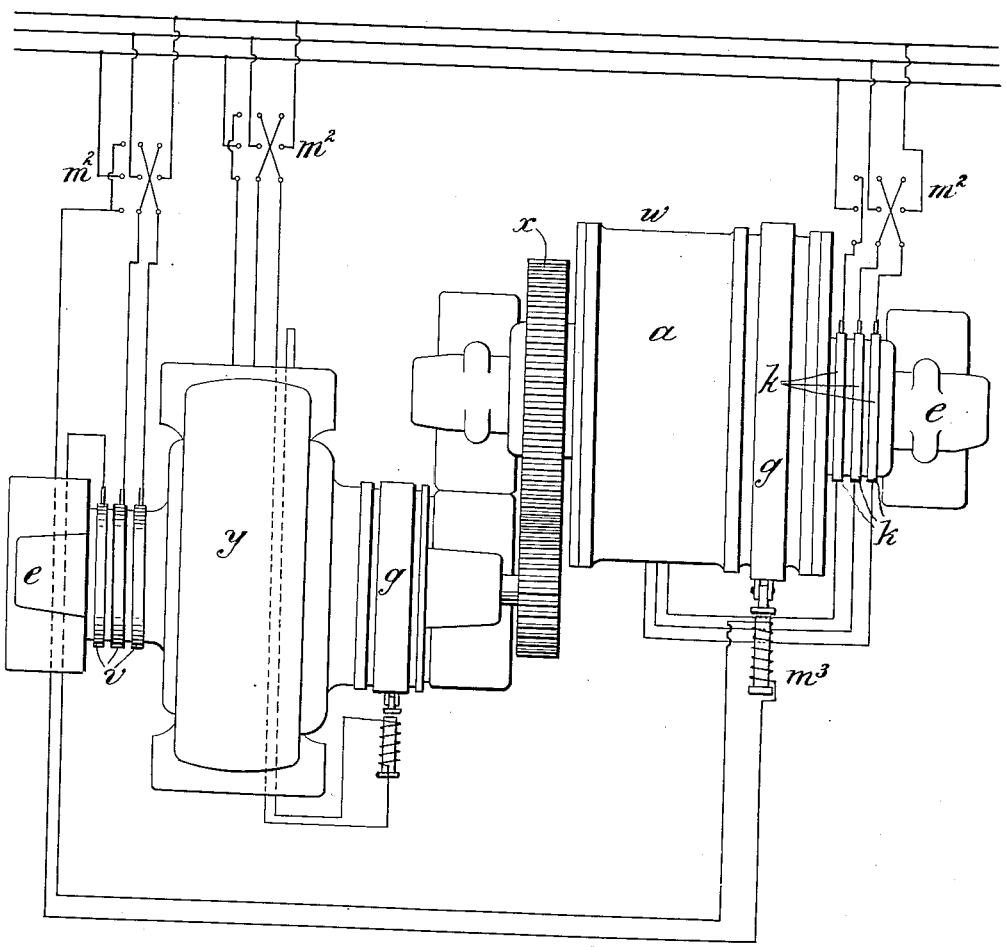

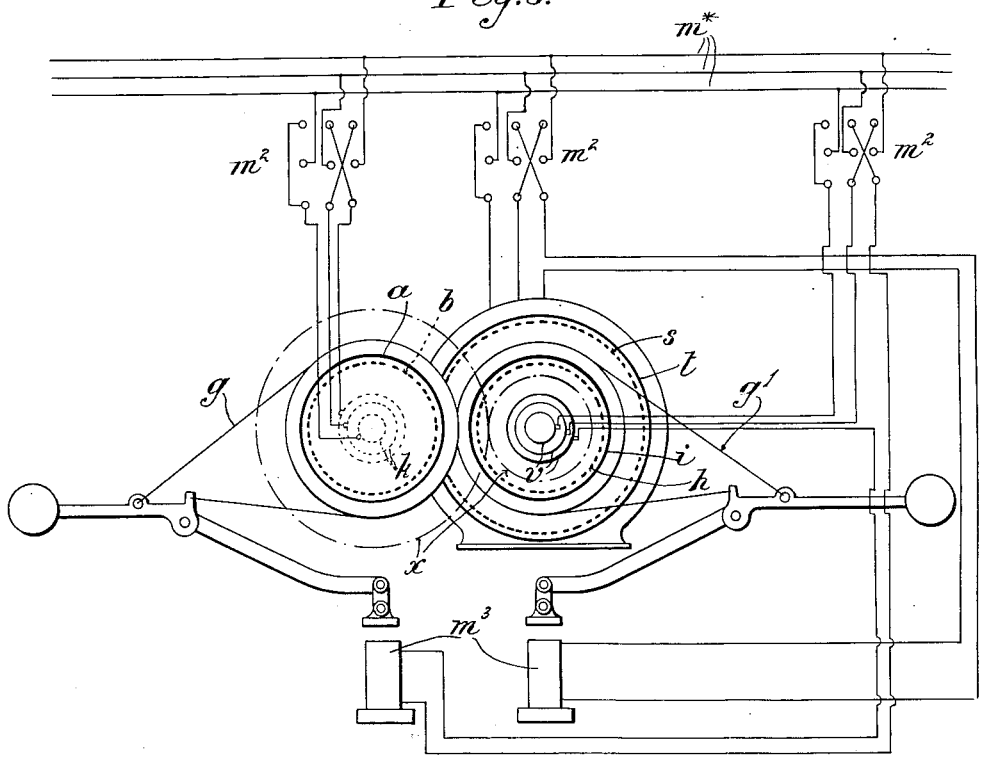

UNITED STATES PATENT OFFICE.

HENRY ALEXANDER MAVOR, OF MILE END, GLASGOW, SCOTLAND.

MULTIPHASE ELECTRIC INDUCTION-MOTOR.

No. 912,144.  Specification of Letters Patent.  Patented Feb. 9, 1909.

Application filed April 17, 1908. Serial No. 427,581.

*To all whom it may concern:*

Be it known that I, HENRY ALEXANDER MAVOR, a subject of the King of Great Britain and Ireland, residing at Mile End, in the county of Glasgow, Scotland, have invented Improvements in Multiphase Electric Induction-Motors, of which the following is a specification.

This invention relates to multiphase electric induction motors, and has for its object to enable the speed of such motors to be altered to different values in an improved manner by an arrangement of a simple and effective character in which, as has already been proposed in other regulating schemes, the primary element is caused to rotate with respect to the secondary.

To achieve the aforesaid object, the primary element of the motor, with respect to which the secondary element or rotor possesses a certain constant and characteristic speed approaching synchronism, is adapted to be held stationary or to be revolved in either a positive or a negative direction by another induction motor. For example, the primary element of the main induction motor may be connected concentrically within, or axially to and at one side of the secondary element of another induction motor which may have a similar characteristic and be of a similar construction to the main motor, be different therefrom, or be capable of adjustment to correspond thereto or not, as may be desired. Let it be assumed, by way of illustration, that the main motor is constructed with four pairs of poles and that the other motor is provided with eight pairs of poles, then, if the periodicity of the current supplied to the main motor be 25 cycles per second, the speed of the rotor, while the primary element is held stationary, will be equal to 375 revolutions per minute. If now the second or regulating motor be connected in circuit, and whatever means may be initially employed to retain the primary element of the main motor be released, the said primary element can be revolved in either the same or the reverse direction to that in which the secondary element or rotor of the main motor is revolving, its speed however being only half that described as obtainable with the main motor while the primary element was held stationary, that is to say only equal to 187.5 revolutions per minute. As will be obvious, the speed, dependent upon the direction of rotation of the primary element of the main motor, will, in the first case just mentioned, be added to the characteristic speed of the secondary element or rotor of the main motor, increasing the same to 562.5 revolutions per minute, or subtracted therefrom in the second case mentioned, reducing the same to 187.5 revolutions per minute.

In the accompanying illustrative drawings Figures 1, 2 and 3 show in longitudinal vertical section and Fig. 4 in plan and Fig. 5 in end elevation, and all more or less diagrammatically, several forms of induction motors embodying the invention.

In Fig. 1, $a$ is the primary element of the main motor surrounding the secondary element $b$ which, as usual, is directly secured upon the shaft $c$ to be driven. The said primary element $a$ is conveniently carried by or formed as part of, a tubular spider or frame $d$ adapted to revolve upon extensions $e^1$ of the main motor bearings $e$ and provided with a band brake wheel $f$ and coacting band $g$ whereby the spider or frame and primary element $a$ can be prevented from rotating when desired. $h$ is the element constituting the rotor of the controlling motor and is likewise carried by, or formed as part of, the spider or frame $d$, while $i$ is the stator of said motor. $k$ are slip rings arranged on the element $a$ of the main motor for starting purposes. $m^*$ are the supply mains, $m^2$ a reversing switch used in conjunction with the slip rings $k$, $m^3$ an electromagnet controlling the band brake $g$ and $m^4$ a reversing switch controlling the supply of current to the element $i$. The operation of this motor, on the assumption already made, will be readily understood from the first part of the specification.

Fig. 2 shows an arrangement in which the controlling motor is axially displaced with respect to the main motor, $a$ and $b$ being, as before, the primary and secondary elements of the latter, and $h$ and $i$ the rotor and stator of the controlling motor. In this case the rotor $h$ is carried by a separate spider or frame $n$, directly coupled to the spider or frame $d$ of the main motor, both spiders or frames being supported by extensions $e^1$ of two outer shaft bearings $e$. In this case the brake band can be applied directly to the periphery $a^1$ of the primary element $a$ of the main motor. $k$ are slip rings in connection with the element $a$ of the main motor for starting purposes, and $m$ and $k^1$ are slip rings in connection with the elements $b$ and $h$ of the motors and resistances $m^5$ for speed regulation.

It is of course to be understood that the induction motor for controlling the primary element of the main motor may be otherwise variously constructed and might, in some instances, advantageously have its own primary element equivalently controlled, so that different and, it may be, a greater range of speed change can be secured than that herein specifically set forth. Fig. 3 shows one example of such an arrangement, the elements $a, b, c, d, e, f, g, h, i$ and $k$ being the same or similar to those described with reference to Fig. 1, the element $i$ however being mounted in a frame or spider $q$ which is revoluble exteriorly upon bearings $r$ which interiorly support the frame or spider $d$. The frame or spider $q$ carries the rotary element $s$ of a third induction motor the stator of which is shown at $t$. $u$ is a band brake wheel and $q^1$ a brake band for the frame $q$, and $v$ are slip rings, similar to the slip rings $k$, for supplying current to the element $i$.

The action is as follows:—Assuming frames $d$ and $q$ to be held stationary and current supplied to the primary element $a$ through the slip rings $k$, then rotor $b$ will rotate at the characteristic speed corresponding to the number of poles in the element $a$. If now the primary element $i$ be supplied with current through the slip rings $v$ and the frame $d$ be liberated so that it is free to rotate in the same direction as the rotor $b$, it will do so at its own characteristic speed, corresponding to the number of poles in the element $i$. The speed of the rotor $b$ now will be the sum of the characteristic speeds of the elements $b$ and $d$. If the stator $t$ is now supplied with current and the frame $q$ be liberated so as to allow it to rotate, it will do so at the characteristic speed corresponding to the number of poles in the stator $t$. The speed of the rotor $b$ will now be the sum of the characteristic speeds of the elements $b$, $d$ and $q$. There are thus three speeds when the elements $d$, $q$ and $t$ are all driving in the positive direction. Similarly, if the frame $q$ be made to rotate in the negative direction while the other elements still do so in the positive direction, the speed of the rotor $b$ will now be equal to the sum of the characteristic speeds of the elements $b$ and $d$ minus that of the frame $q$. If next, the frame $d$ be caused to rotate in the reverse direction but the frame $q$ caused to rotate in the positive direction, the speed of the rotor $b$ will be equal to the sum of the characteristic speeds of the elements $b$ and $q$ minus that of the frame $d$. If the frames $d$ and $q$ are being rotated in the positive direction and the current to the element $a$ be reversed, the rotor $b$ will revolve in the negative direction relatively to the frame $d$ while the actual speed in the positive direction will be the sum of the characteristic speeds of the frames $d$ and $q$ minus that of the rotor $b$. If the frame $q$ be held stationary while the frame $d$ and rotor $b$ are driven in opposite directions, the speed of the rotor $b$ will be equal to the difference between the characteristic speeds of the rotor $b$ and that of the frame $d$. Thus seven definite speeds in all are available with this arrangement of the motor.

Also, as a modification, gearing may be incorporated in the arrangement. For example in Figs. 4 and 5 $w$ may represent an induction motor comprising elements such as $a$ and $b$ of Fig. 3, the element $a$ being arranged to be held stationary by a band brake $g$, or to be rotated, when liberated, in either direction giving to the rotor three speeds as in the last named instance, through the gear wheels $x$ by another induction motor $y$ which may comprise, as shown, elements such as $h, i, s, t$, all capable of operation as described with reference to Fig. 3 so that it will be apparent the same number of changes of speed can be secured modified only by the value of the gearing $x$.

It will be understood that in all the examples the band brakes $g$, $g^1$ and electromagnets $m^3$ controlling the same may be variously constructed but may conveniently be constituted as shown in Fig. 5, the frame or spider corresponding to its particular brake being held at rest while no current is flowing. As soon as the magnet is energised the frame or spider and attached parts are free to revolve.

The primary and secondary elements of the motor may be, in practice, interchangeable in respect of their axial relations and their connection to the work or load.

The motors may be supplied with electric current from one or two separate electric generators.

The details of construction can be variously modified.

What I claim is:—

1. A multiphase electric induction motor comprising a rotor, a rotor encircling induction element capable of being revolved, a controlling multiphase induction motor having a secondary element in driving connection with the said rotor encircling induction element, and means operated at will for holding said encircling induction element stationary and releasing the same when starting the controlling motor.

2. The combination with the rotor of a multiphase induction motor, of an encircling induction element capable of being revolved, means for holding said element stationary at will, a controlling multiphase induction motor for revolving the aforesaid element, said controlling motor having a rotor connected to the encircling induction element of the first motor and an induction element encircling the last named rotor and which can be itself revolved, means for holding the encircling induction element of the controlling motor stationary at will, and means whereby the latter encircling element can be revolved in either a positive or a negative direction.

3. The combination with the rotor of a multiphase induction motor, of an encircling induction element capable of being revolved, means for holding said element stationary at will, a controlling multiphase induction motor encircling the aforesaid encircling element, said controlling motor having a rotor connected to the encircling element of the first motor and an induction element encircling the last named rotor and which can be itself revolved, means for holding the encircling element of the controlling motor stationary at will, and means whereby the latter encircling element can be revolved in either a positive or a negative direction.

Signed at Glasgow Scotland this seventh day of April, 1908.

HENRY ALEXANDER MAVOR.

Witnesses:
W. B. HIRD,
ROBERT S. JOHNSTON.